(12) United States Patent
Su et al.

(10) Patent No.: US 12,705,002 B2
(45) Date of Patent: Aug. 11, 2026

(54) SYSTEM AND METHOD FOR CONTROLLED REPRINTING WITHIN AN AUTHENTICATED SESSION

(71) Applicant: Toshiba TEC Kabushiki Kaisha, Shinagawa-ku (JP)

(72) Inventors: William Su, Riverside, CA (US); Christopher Nguyen, Huntington Beach, CA (US)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 177 days.

(21) Appl. No.: 18/400,215

(22) Filed: Dec. 29, 2023

(65) Prior Publication Data

US 2025/0217083 A1 Jul. 3, 2025

(51) Int. Cl.
*G06F 3/12* (2006.01)

(52) U.S. Cl.
CPC .......... *G06F 3/1204* (2013.01); *G06F 3/1208* (2013.01); *G06F 3/1237* (2013.01); *G06F 3/1256* (2013.01); *G06F 3/1274* (2013.01)

(58) Field of Classification Search
None
See application file for complete search history.

(56) References Cited

U.S. PATENT DOCUMENTS

2004/0176117 A1* 9/2004 Strittmatter ....... H04M 1/72412 455/500
2004/0190057 A1* 9/2004 Takahashi ............ G06F 3/1205 358/1.15
2009/0204804 A1* 8/2009 Okubo .............. H04N 1/00482 726/17
2015/0301773 A1 10/2015 Minagawa
2020/0220985 A1* 7/2020 Keery ................ G06F 21/6209

* cited by examiner

*Primary Examiner* — Darryl V Dottin
(74) *Attorney, Agent, or Firm* — Kim & Stewart LLP

(57) ABSTRACT

A system and method for generating reprints of documents from an authenticated user's print queue enables generating proof prints both before and after a print job has been released for printing. Print issues that surface in a printed document can be addressed, and a proof print can be made from the print job that remains in the queue after printing, with no need of resubmitting the job from a user's workstation. A proof print may be a reprint of the entire document or printing of a test page.

20 Claims, 6 Drawing Sheets

SYSTEM AND METHOD FOR CONTROLLED REPRINTING WITHIN AN AUTHENTICATED SESSION

TECHNICAL FIELD OF THE INVENTION

This application relates generally to printing. The application relates more particularly to a persistent job print queue for an authenticated user wherein jobs remain in the authenticated queue after release for reprinting as a complete document or a proof page to address print issues associated with a print job already released.

BACKGROUND OF THE INVENTION

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

With Multi-Function Printers (MFPs), a proof print functions as a preliminary output designed to validate quality and configurations of the device's printing, copying, or scanning capabilities. Within office environments and print shops, where MFPs are versatile tools for various document-related tasks, this practice is particularly relevant. Whether preparing for a substantial print job, verifying the clarity and precision of copied documents, or confirming accurate representation of scanned images, a proof print serves as a useful checkpoint. This process ensures that the formatting, layout, and overall output meet predefined standards, helping to prevent wastage of resources on larger print or copy runs in the presence of potential issues. Additionally, it aids in confirming that the MFP's settings, encompassing color options, resolution, and paper type, align appropriately with the specific requirements of the task at hand, thereby enhancing the efficiency and reliability of the multifunctional device.

BRIEF DESCRIPTION OF THE DRAWINGS

Various embodiments will become better understood with regard to the following description, appended claims and accompanying drawings wherein:

DETAILED DESCRIPTION OF THE INVENTION

Figure 1:
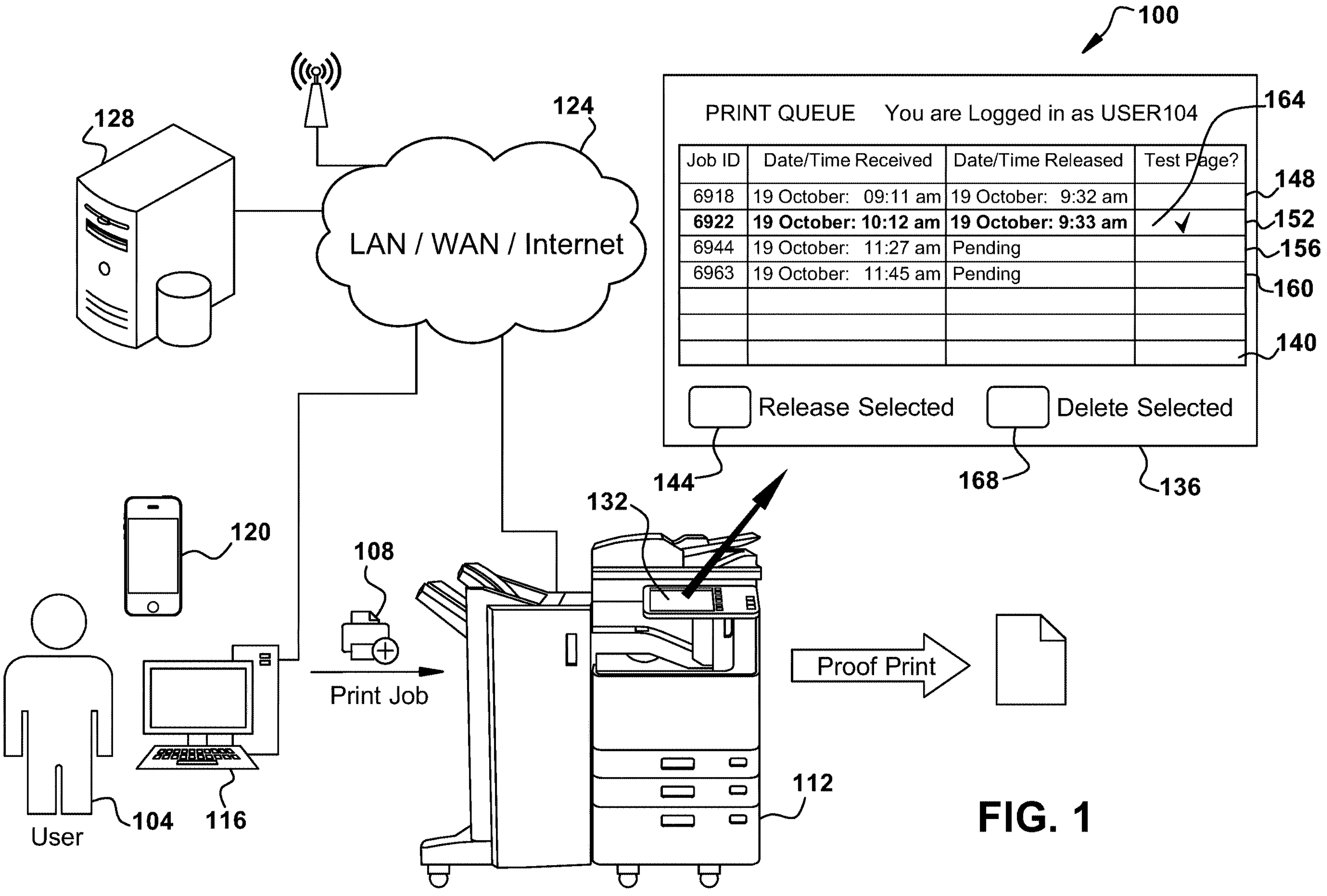
FIG. 1 is an example embodiment of a system for controlled reprinting in authenticated user environment.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

Following an examination of a proof print from a Multi-Function Printer (MFP), users may find it necessary to implement several setting changes to enhance print quality and meet specific criteria. For instance, if colors appear inaccurate, adjustments to saturation, contrast, or color balance settings can be made. To address issues related to sharpness and clarity, users might opt to increase the resolution settings. Ensuring proper paper type and size is selected is important, and adjustments in duplex printing settings may be made to prevent alignment problems. Additionally, users may fine-tune print quality settings, scanning resolution, file format preferences, and toner or ink density based on the feedback provided by the proof print. Attention to margins, layout, and the presence of watermarks or overlays may also be necessary for a more refined and accurate final output. Through these thoughtful adjustments, users aim to optimize MFP settings, ensuring that the subsequent prints align precisely with their expectations and requirements.

A user who is logged in to an MFP may see a listing of jobs in their print queue. Proof printing is typically accomplished by a user selected proof print control prior to a full rendering of their print job. A selection may be made, for example, by selecting a proof print option from an MFP touchscreen for a selected queue entry. If a proof print is unacceptable, suitable adjustments can be made by the user. Additional proof prints can be made, if desired, until the desired result is obtained. At that point, the job is released, printed and removed from the queue.

Situations may arrive where a complete job is printed before an image issue is discovered. For example, a user releases a first, black and white, print job from their queue and it is rendered to their satisfaction. They then release their second job, which is in color. The color rendering is not to their satisfaction, requiring them to make adjustment to printer settings. However, the job was removed from their queue once it was printed. The user must then resubmit the job to the MFP in in order make settings adjustments, such as by returning to their workstation and resending the job via the associated printer driver. They may then reprint the entire document, but would benefit by generating a test proof print, such as a first page of the document, before doing so. As noted above, they must first go through the step of requesting a proof print prior to generating a full printout to keep the job in their queue. The full document would be released when one or more a proof print test page reveals no further print issues. Even after following this process, the user may determine additional print issues that aren't apparent without a full printout. Again, they would be forced to resubmit the document to get it back in their queue for further settings refinement.

In another example situation, a user may select a job in their queue, it is rendered completely, but includes media that was torn, shredded or smeared due to a paper jam. They can address the concern, but they must still return to their workstation to resubmit their job as it is no longer in their queue.

Example embodiments herein provide automated proof printing within an authenticated print session, eliminating a need for a dedicated "proof print" control function. This system addresses the common challenge of users requiring proof prints after documents have been printed, while also handling scenarios such as paper jams. By intelligently delaying the deletion of printed jobs until the user concludes the authenticated session, the system streamlines the proof print process.

Example embodiments of the subject system and method address the problem by introducing a controlled reprinting feature within an authenticated session. This is accomplished via controlled deletion of print jobs from an MFP. When a print job is sent to the MFP, instead of being immediately deleted upon successful release, the system preserves the print job data on the MFP and associates it with the user's authenticated session.

The print jobs remain available for reprinting until one of two conditions is met: either the user explicitly closes their authenticated session at the MFP, signaling that the print jobs are no longer needed, or an automated session timeout occurs due to inactivity. Upon the occurrence of either condition, the print jobs associated with the session are deleted from the MFP, thus maintaining the balance between controlled reprinting and efficient document management. Example embodiments provide:

- Seamless Proof Printing: Proof prints are automated without requiring a dedicated proof print button, enhancing user experience and efficiency.
- Error Handling: Automatic handling of paper jams ensures seamless proof prints even in exceptional scenarios.
- Enhanced Workflow: Users can rely on the system to provide proof prints as needed, eliminating manual steps.

FIG. 1 is illustrates an example embodiment of a system 100 for controlled reprinting in authenticated user environment. User 104 sends one or more print jobs, such as print job 108 to MFP 112 via a device such as workstation 116 or a portable device, such as smartphone or tablet, illustrated as portable user device 120. Included in FIG. 1 is network cloud 124, suitably comprised of a local area network (LAN), a wide area network (WAN), which may comprise the Internet, or any suitable combination thereof. Network cloud 124 is comprised of any suitable wireless or wired data connection or combination thereof and provides for data transfer between devices such as MFP 112, workstation 116 or portable user device 120. Print job 108 is suitably sent directly to MFP 112, or via a networked server, such as server 128. In the illustrated example, documents are not printed by MFP 112 immediately upon receipt, but are rather placed in a queue associated with user 104. When user 104 wishes to get a job printout, they log in to user interface 132, suitably a touchscreen, on MFP 112. Once logged in, display screen 136 is generated on user interface 132. Included in display screen 136 is a print queue 140 listing jobs queued for logged in user 104. In the illustrated example, user 104 has four jobs in their queue, jobs 148, 152, 156 and 160 illustrated as selectable indicia. User 104 selects one or more of their pending print jobs for release, suitably by touching each desired job on user interface 132. User 104 then selects release button 144, and each selected job is released and printed. In the illustrated example, jobs 148 and 152 have already been released and printed. However, they are maintained in the user's queue, including an indicator that they have already been printed, such as the illustrated date and time of printing. Jobs 156 and 160 are not yet released. The user may also select documents for deletion from the queue, such as via delete button 168.

If any printed job is associated with a print error, the user may select it for reprinting as it remains in the queue, suitably after one or more causes of the print error are addressed. In the example, a print error was associated with a printout from job 152, and it has been selected to be released for reprinting. The entire document may be reprinted. Alternatively, the user can select printing of a test page at location 164. If selected, re-release of job 152 would allow for determination if print errors remain, calling for additional remedial action. Once all errors appear as addressed, the user can select the entire job for reprinting. After reprinting, the job remains in the queue, suitably with an updated print time and date. Jobs are retained in the queue until the user logs out, or until a timeout period, such as an inactivity timeout, is achieved. At that point, all unprinted jobs that remain in the user's queue are suitably printed, and the queue is cleared.

Figure 2:
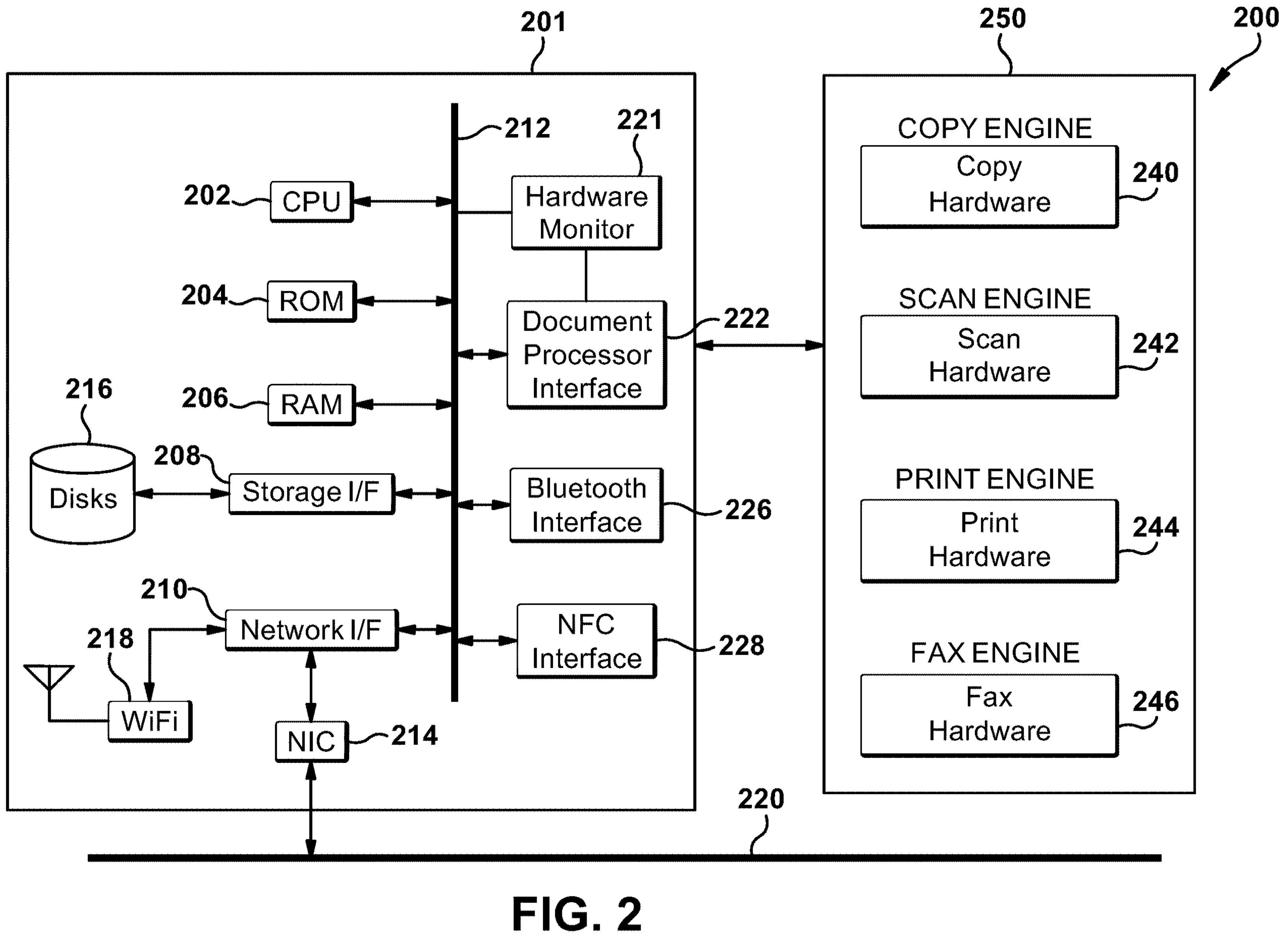
FIG. 2 is an example embodiment of a networked digital device, such as a multifunction peripheral.

Turning now to FIG. 2, illustrated is an example embodiment of a networked digital device comprised of document rendering system 200 suitably comprised within an MFP, such as with MFP 112 of FIG. 1. It will be appreciated that an MFP includes an intelligent controller 201 which is itself a computer system. Thus, an MFP can itself function as a server with the capabilities described herein. Included in intelligent controller 201 are one or more processors, such as that illustrated by processor (CPU) 202. Each processor is suitably associated with non-volatile memory, such as read-only memory (ROM) 204, and random access memory (RAM) 206, via a data bus 212.

Processor 202 is also in data communication with document processor input/output interface 222, suitably comprising a user touchscreen. While touchscreens are discussed in example embodiments herein, it is to be appreciated that any suitable user interface, such as keyboards, switches, displays, trackballs or mice may be used.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with additional interfaces, such as Bluetooth interface 226 or NFC interface 228.

Processor 202 is also in data communication with a network interface 210 which provides an interface to a network interface controller (NIC) 214, which in turn provides a data path to any suitable wired interface or physical network connection 220, or to a wireless data connection via wireless network interface 218. Example wireless network interfaces include optical, cellular, Wi-Fi, wireless universal serial bus (wireless USB), satellite, and the like. Example wired interfaces include Ethernet, USB, IEEE 1394 (FireWire), Lightning, telephone line, or the like.

Processor 202 can also be in data communication with any suitable user input/output (I/O) network interface 222 which provides data communication for interfacing with user peripherals, such as displays, keyboards, mice, track balls, touch screens, or the like.

Also in data communication with data bus 212 is a document processor interface 222 suitable for data communication with the document rendering system 250, including MFP functional units. In the illustrated example, these units include a copy engine comprising copy hardware 240, a scan engine comprise of scan hardware 242, a print engine comprised of print hardware 244 and a fax engine comprised of fax hardware 246 which together comprise document rendering system 250. It will be understood that functional units are suitably comprised of intelligent units, including any suitable hardware or software platform.

Figure 3:
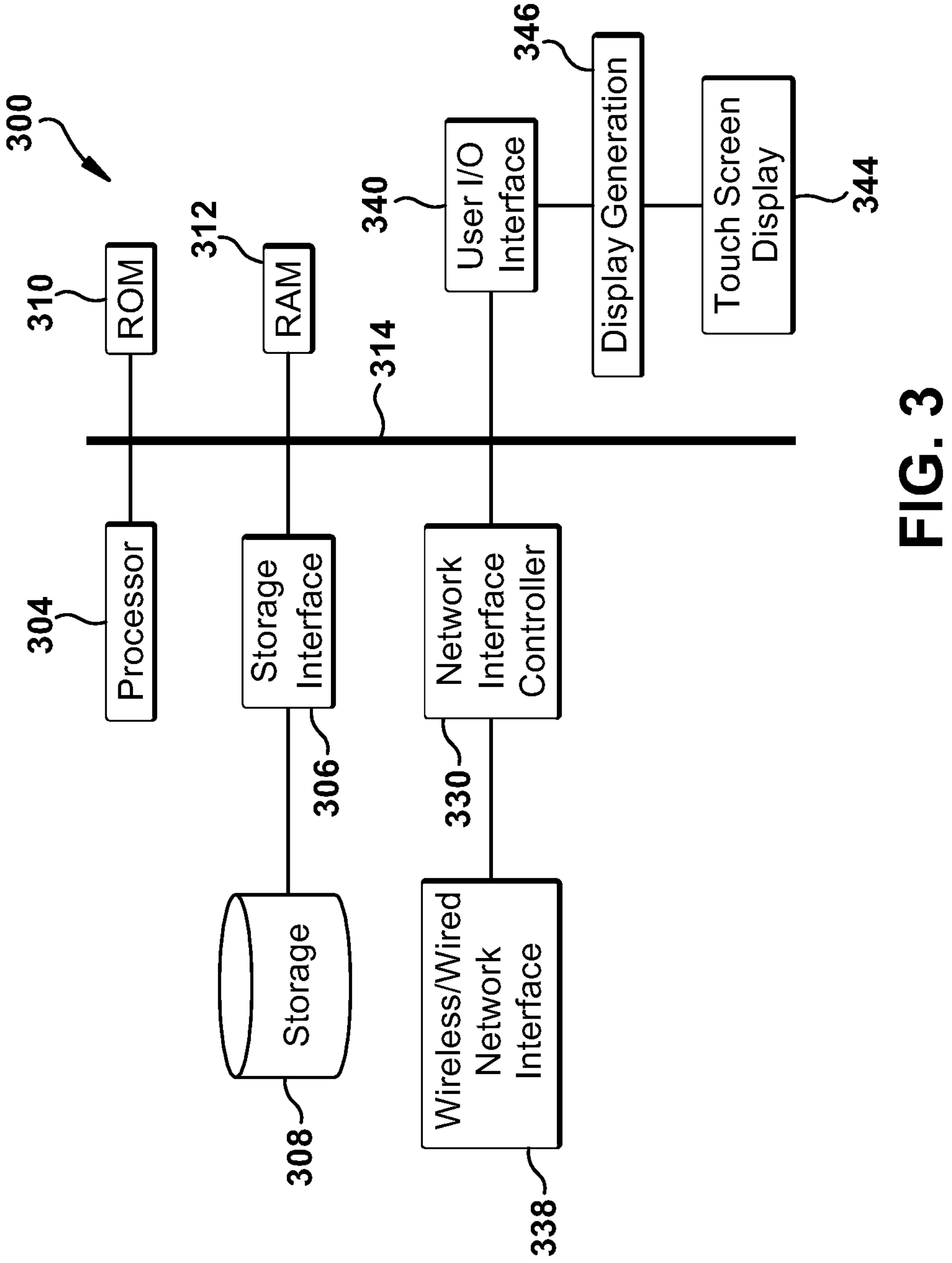
FIG. 3 is an example embodiment of a digital device system.

Turning now to FIG. 3, illustrated is an example embodiment of a digital data processing device 300 such as workstation 116, portable user device 120 and server 128 of FIG. 1. It is to be appreciated that some components listed may be unnecessary in certain configurations. Components of the digital data processing device 300 suitably include one or more processors, illustrated by processor 304, memory, suitably comprised of read-only memory 310 and random access memory 312, and bulk or other non-volatile storage 308, suitably connected via a storage interface 306. Data communication among components is accomplished via data bus 314. A network interface controller 330 suitably provides a gateway for data communication with other devices, via any wireless or wired connection, such as via wireless network interface 338. A user input/output interface 340 is suitably comprised of display generator 346 interfacing with touchscreen display 344. As noted above, any suitable user input and display can be used.

Figure 4:
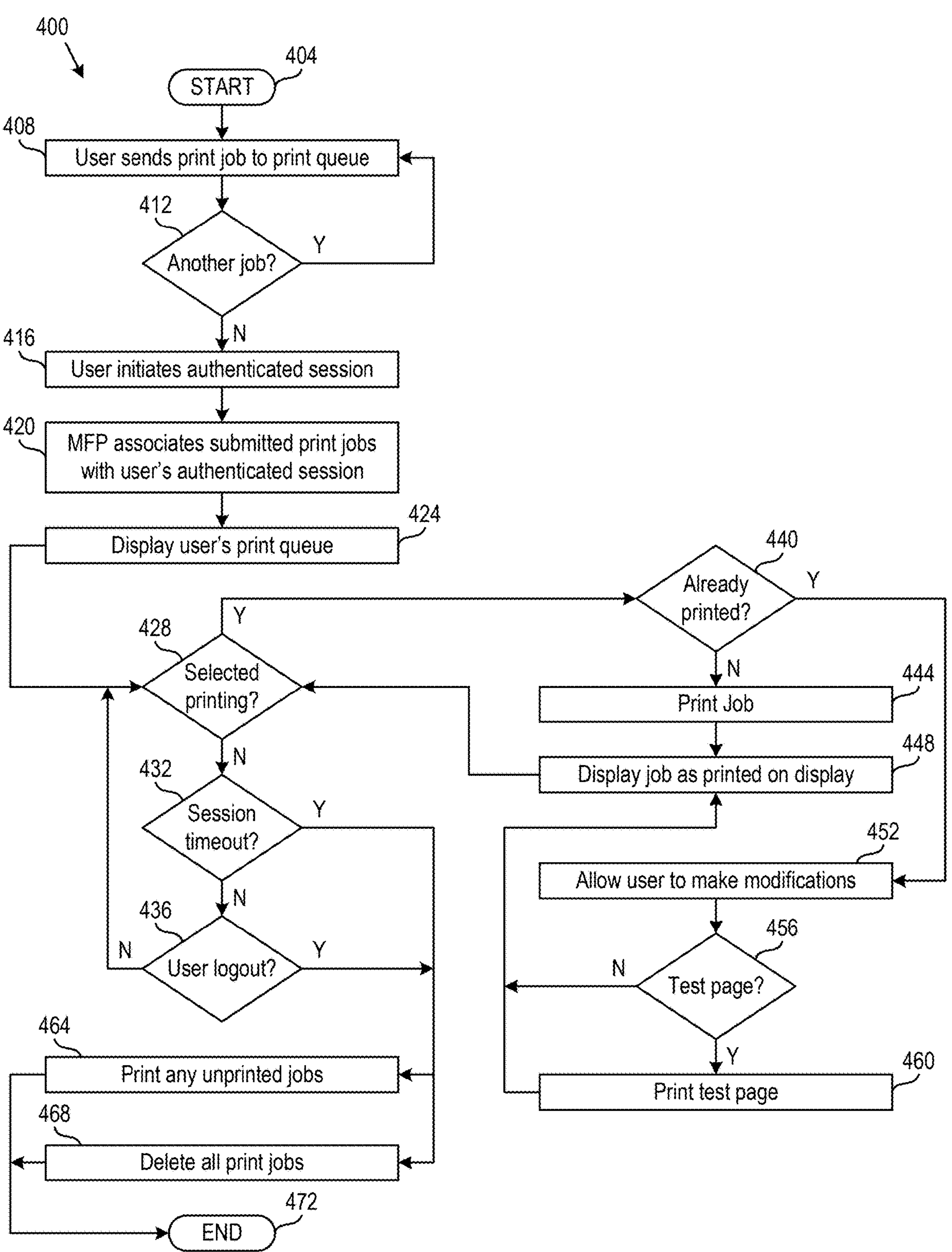
FIG. 4 is a flowchart of an example embodiment of a system for controlled reprinting in authenticated user environment.

FIG. 4 illustrates flowchart 400 of an example embodiment of a system for controlled reprinting in authenticated user environment. The process commences at block 404 and proceeds to block 408 where a user sends a print job from their device to a print queue, suitably via a print driver associated with their device. If another print job is to follow from block 412, the process returns to block 408. Once no further print jobs are to be sent, the process moves to block 416 wherein a user initiates an authenticated session at an MFP, such as by logging in. Next, the MFP associates submitted print jobs with the user's authenticated session at block 420 and their queue is displayed at block 424. When no job is selected for printing at block 428, a test is made at block 432 as to whether the user's session has timed out or whether the user has logged out at block 436. If neither are true, the system returns to block 428. If the session has timed out, the job is moved to block 464 to print any unprinted jobs or to block 468 to delete all jobs from the authenticated session and the process ends at 472. When a job has been selected for printing as determined by block 428, a test is made at block 440 to determine if the job has already been printed. If not, the job is printed at block 444, and shown as printed on the display at block 448. The process then returns to block 428. If the selected job is reprint, the user has opportunity at block 452 to make modifications to address any discovered print errors. If it is determined at block 456 that the user has selected to print a test page only, the test page is printed at block 460 before progressing to block 448, from which it returns to block 428. If no test page has been specified, the process proceeds to block 448. The system then returns to block 428.

Figure 5:
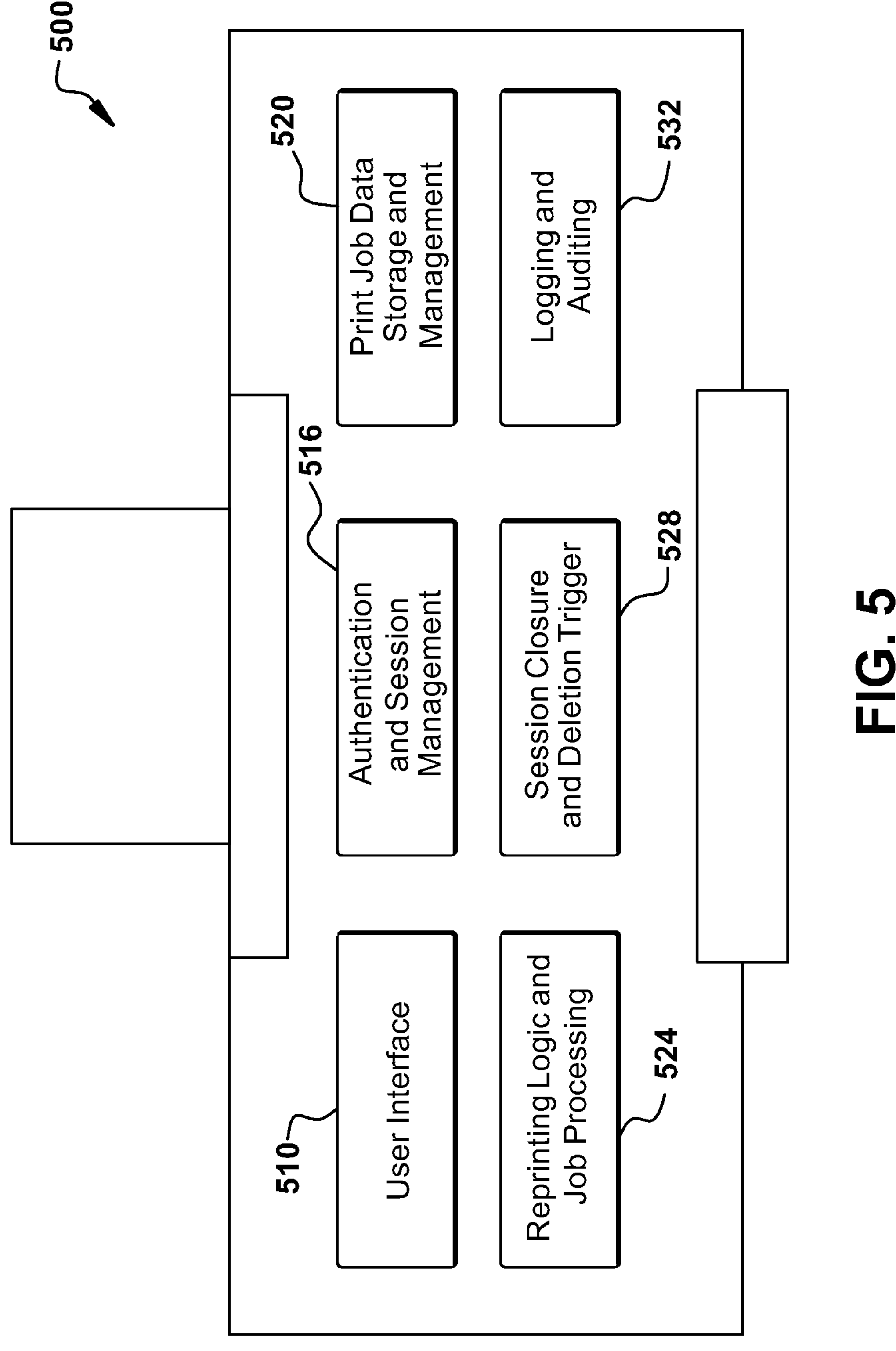
FIG. 5 is an example embodiment of a software block diagram for a system for controlled reprinting in authenticated user environment.

FIG. 5 illustrates an example embodiment of a software block diagram 500 for a system for controlled reprinting in authenticated user environment. Included is user interface module 510, authentication and session management module 516, print job data storage and management module 520, reprinting logic and job processing module 524, session closure and deletion trigger module 528, and logging and auditing module 532.

Figure 6:
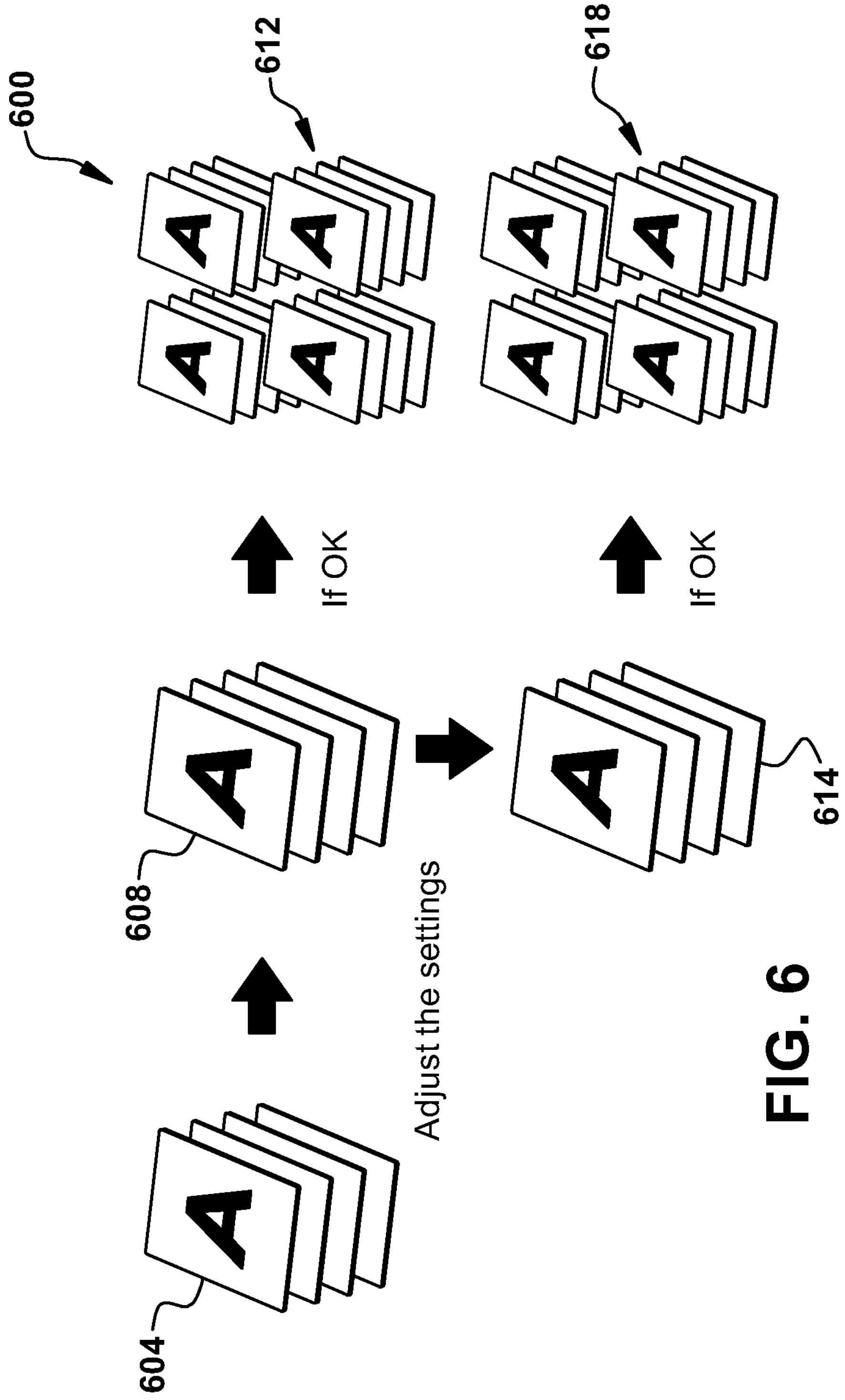
FIG. 6 is an example embodiment of a system overview block diagram for a system for controlled reprinting in authenticated user environment.

FIG. 6 is an example embodiment of a system overview block diagram 600 for a system for controlled reprinting in authenticated user environment. A print job 604 generates printout 608. If the print job is acceptable, one or more additional printouts 612 are suitably made, if needed. If printout 608 manifests print errors, device adjustments are made and an additional printout 614 is made of a test page or the entire document. If this is now acceptable, one or more additional printouts 618 are made, if needed. Additional device adjustments are suitably made until a rendered document is deemed acceptable.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A multifunction peripheral comprising:

a network interface configured to receive print job data;

a processor configured to store the received print job data at the multifunction peripheral; and a user interface configured to detect login data entered at the multifunction peripheral, including by a user associated with the received print job data, wherein the processor is further configured to:

associate, upon the user logging in at the multifunction peripheral via the user interface, one or more print jobs from the received print job data, with an authenticated session of the user;

control, while the authenticated session is active, a display of the user interface to display indicators corresponding to each of the one or more print jobs;

execute a print job of the one or more print jobs selected by the user via the user interface, in accordance with selection of the indicator corresponding to the print job;

control, after a completion of the print job and in accordance with the authenticated session still being active, the display of the user interface to continue displaying the indicator corresponding to the print job and an additional indicator of the completion of the print job;

print a test page of the completed print job in accordance with a reselection of the print job made by the user via the user interface during the continued displaying of the indicator corresponding to the print job;

determine, after the printing of the test page, that a user logoff or inactivity timeout of the authenticated session has occurred; and delete the received print job data from the multifunction peripheral in accordance with the determined user logoff or inactivity timeout of the authenticated session.

2. The multifunction peripheral of claim 1, wherein the processor is further configured to:

modify, in accordance with user input received via the user interface after the completion of the print job but before the printing of the test page, settings associated with the printing of the test page.

3. The multifunction peripheral of claim 2, wherein modifying the settings associated with the printing of the test page includes updating one or more of a paper type, a print quality, a print resolution, a page contrast, and a print color.

4. The multifunction peripheral of claim 1, wherein the processor is further configured to:

control, after the printing of the test page, the display of the user interface to continue displaying the indicator corresponding to the print job and an additional indicator of the printing of the test page.

5. The multifunction peripheral of claim 1, wherein the processor is further configured to:

modify in accordance with user input received via the user interface after the printing of the test page, settings associated with another execution of the print job.

6. The multifunction peripheral of claim 5, wherein modifying the settings associated with the other execution of the print job includes updating one or more of a paper type, a print quality, a print resolution, a page contrast, and a print color.

7. A method of managing the execution of print jobs at a multifunction peripheral, the method comprising:

receiving print job data via a network interface of the multifunction peripheral;

storing the received print job data at the multifunction peripheral;

detecting login data via a user interface of the multifunction peripheral, including by a user associated with the received print job data;

associating, upon the user logging in at the multifunction peripheral via the user interface, one or more print jobs from the received print job data, with an authenticated session of the user;

controlling, while the authenticated session is active, a display of the user interface to display indicators corresponding to each of the one or more print jobs;

executing a print job of the one or more print jobs selected by the user via the user interface, in accordance with selection of the indicator corresponding to the print job;

controlling, after a completion of the print job and in accordance with the authenticated session still being active, the display of the user interface to continue displaying the indicator corresponding to the print job and an additional indicator of the completion of the print job;

re-executing the print job in accordance with a reselection of the indicator corresponding to the print job made by the user via the user interface during the continued displaying of the indicator corresponding to the print job;

determining, after the re-execution of the print job, that a user logoff or inactivity timeout of the authenticated session has occurred; and deleting the received print job data from the multifunction peripheral in accordance with the determined user logoff or inactivity timeout of the authenticated session.

8. The method of claim 7, further comprising:

modifying, in accordance with user input received via the user interface after the completion of the print job but before the re-execution of the print job, settings associated with the re-execution of the print job.

9. The method of claim 8, wherein modifying the settings associated with the re-execution of the print job includes updating one or more of a paper type, a print quality, a print resolution, a page contrast, and a print color.

10. The method of claim 7, further comprising:

printing a test page of the print job; and controlling, after the printing of the test page, the display of the user interface to display an additional indicator of the printing of the test page.

11. The method of claim 10, wherein the printing of the test page occurs before the re-execution of the print job, the method further comprising:

modifying, in accordance with user input received via the user interface after the printing of the test page but before the re-execution of the print job, settings associated with the re-execution of the print job.

12. The method of claim 11, wherein modifying the settings associated with the re-execution of the print job includes updating one or more of a paper type, a print quality, a print resolution, a page contrast, and a print color.

13. The multifunction peripheral of claim 1, wherein the one or more print jobs includes a plurality of print jobs, and the processor is further configured to:

execute, in accordance with the user logoff or inactivity timeout of the authenticated session, print jobs of the plurality of print jobs that were not previously completed during the authenticated session.

14. The multifunction peripheral of claim 1, wherein controlling the display of the user interface to continue displaying the indicator corresponding to the print job includes controlling the display of the user interface to display a print queue associated with the user, the print queue continuing to include the print job after the completion of the print job.

15. The method of claim 7, wherein the one or more print jobs includes a plurality of print jobs, the method further comprising:

executing, in accordance with the user logoff or inactivity timeout of the authenticated session, print jobs of the plurality of print jobs that were not previously completed during the authenticated session.

16. The method of claim 7, wherein controlling the display of the user interface to continue displaying the indicator corresponding to the print job includes controlling the display of the user interface to display a print queue associated with the user, the print queue continuing to include the print job after the completion of the print job.

17. A method of managing the execution of print jobs and printing of test pages at a multifunction peripheral, the method comprising:

receiving print job data via a network interface of the multifunction peripheral;

storing the received print job data at the multifunction peripheral;

detecting login data via a user interface of the multifunction peripheral, including by a user associated with the received print job data;

associating, upon the user logging in at the multifunction peripheral via the user interface, one or more print jobs from the received print job data, with an authenticated session of the user;

controlling, while the authenticated session is active, a display of the user interface to display indicators corresponding to each of the one or more print jobs;

executing a print job of the one or more print jobs selected by the user via the user interface, in accordance with selection of the indicator corresponding to the print job;

controlling, after a completion of the print job and in accordance with the authenticated session still being active, the display of the user interface to continue displaying the indicator corresponding to the print job and an additional indicator of the completion of the print job;

printing a test page of the completed print job in accordance with a reselection of the print job made by the user via the user interface during the continued displaying of the indicator corresponding to the print job;

determining, after the printing of the test page, that a user logoff or inactivity timeout of the authenticated session has occurred; and deleting the received print job data from the multifunction peripheral in accordance with the determined user logoff or inactivity timeout of the authenticated session.

18. The method of claim 17, further comprising:

modifying, in accordance with user input received via the user interface after the completion of the print job but before the printing of the test page, settings associated with the printing of the test page.

19. The method of claim 18, wherein modifying the settings associated with the printing of the test page includes updating one or more of a paper type, a print quality, a print resolution, a page contrast, and a print color.

20. The method of claim 17, further comprising:

controlling, after the printing of the test page, the display of the user interface to continue displaying the indicator corresponding to the print job and an additional indicator of the printing of the test page.

* * * * *